United States Patent
Elboth et al.

(10) Patent No.: US 11,169,293 B2
(45) Date of Patent: Nov. 9, 2021

(54) DEVICE AND METHOD FOR MODEL-BASED DEBLENDING

(71) Applicant: CGG SERVICES SAS, Massy (FR)

(72) Inventors: Thomas Elboth, Oslo (NO); Jamshade Khan, Oslo (NO); Honglei Shen, Oslo (NO); Tran Thinh To, Singapore (SG)

(73) Assignee: CGG SERVICES SAS, Massy (FR)

( * ) Notice: Subject to any disclaimer, the term of this patent is extended or adjusted under 35 U.S.C. 154(b) by 454 days.

(21) Appl. No.: 15/817,444

(22) Filed: Nov. 20, 2017

(65) Prior Publication Data

US 2018/0164455 A1 Jun. 14, 2018

Related U.S. Application Data

(60) Provisional application No. 62/445,422, filed on Jan. 12, 2017, provisional application No. 62/433,322, filed on Dec. 13, 2016.

(51) Int. Cl.
*G01V 1/36* (2006.01)
*G01V 1/30* (2006.01)
*G01V 1/38* (2006.01)

(52) U.S. Cl.
CPC .......... *G01V 1/364* (2013.01); *G01V 1/30* (2013.01); *G01V 1/36* (2013.01); *G01V 1/38* (2013.01);
(Continued)

(58) Field of Classification Search
CPC . G01V 1/364; G01V 1/30; G01V 1/36; G01V 1/38; G01V 2210/3246; G01V 2210/3248
(Continued)

(56) References Cited

U.S. PATENT DOCUMENTS

| 4,910,716 A | 3/1990 | Kirlin et al. |
| 4,992,992 A | 2/1991 | Dragoset, Jr. |

(Continued)

FOREIGN PATENT DOCUMENTS

| WO | 2015063595 A1 | 5/2015 |
| WO | 2016110738 A1 | 7/2016 |

OTHER PUBLICATIONS

Ma et al., "Seismic data reconstruction based on Compressed Sensing", Jun. 2016. (Year: 2016).*

(Continued)

*Primary Examiner* — Michael P Nghiem
(74) *Attorney, Agent, or Firm* — Patent Portfolio Builders PLLC

(57) ABSTRACT

Computing device, computer instructions and method for removing cross-talk noise from seismic data and generating an image of a surveyed subsurface. The method includes receiving input seismic data D generated by firing one or more seismic sources so that source energy is overlapping, and the input seismic data D is recorded with seismic sensors over the subsurface; generating a cross-talk noise model N by replacing at least one original shot gather with a reconstructed shot gather; subtracting the cross-talk noise model N from the input seismic data D to attenuate coherent cross-talk noise to obtain processed seismic data $D_p$; deblending the processed seismic data $D_p$ with a deblending algorithm to attenuate a residual noise to obtain deblended seismic data $D_d$; and generating the image of the subsurface based on the deblended seismic data $D_d$.

18 Claims, 15 Drawing Sheets

(52) U.S. Cl.
CPC ............... *G01V 2210/3246* (2013.01); *G01V 2210/3248* (2013.01)

(58) Field of Classification Search
USPC .......................................................... 702/16
See application file for complete search history.

(56) References Cited

U.S. PATENT DOCUMENTS

| | | | |
|---|---|---|---|
| 8,593,904 B2 | 11/2013 | Soubaras | |
| 10,386,518 B2* | 8/2019 | Peng .................... | G01V 1/364 |
| 2014/0303898 A1* | 10/2014 | Poole .................... | G01V 1/003 |
| | | | 702/17 |
| 2014/0365135 A1* | 12/2014 | Poole .................... | G01V 1/36 |
| | | | 702/17 |
| 2015/0212222 A1* | 7/2015 | Poole .................... | G01V 1/282 |
| | | | 702/14 |
| 2015/0293249 A1 | 10/2015 | Peng et al. | |
| 2015/0331124 A1* | 11/2015 | Haacke ................. | G01V 1/364 |
| | | | 702/16 |
| 2016/0245942 A1* | 8/2016 | Poole .................... | G01V 1/282 |
| 2017/0115415 A1* | 4/2017 | Ozbek ................... | G01V 1/282 |
| 2017/0371055 A1* | 12/2017 | Poole .................... | G01V 1/368 |
| 2018/0113230 A1* | 4/2018 | Guillouet .............. | G01V 1/364 |

OTHER PUBLICATIONS

Extended European Search Report in European Application No. EP 17 30 6644 dated May 28, 2018.
Chao Peng et al., "Deblending of simulated simultaneous sources using an iterative approach: an experiment with variable-depth streamer data", SEG Houston 2013 Annual Meeting, Sep. 22-27, 2013, Houston, Texas, pp. 4278-4282.
Ed Hager et al., "Baxter: a high-resolution penta-source marine 3D seismic acquisition", SEG International Exposition and 86th Annual Meeting, Oct. 16-21, 2016, Dallas, Texas, pp. 173-177.
G. Poole et al., "Blended Dual-source Acquisition and Processing of Broadband Data", 76th EAGE Conference & Exhibition 2014, Amsterdam, The Netherlands, Jun. 16-19, 2014.
Ken Larner et al., "Coherent noise in marine seismic data", Geophysics, Jul. 1983, pp. 854-886, vol. 48, No. 7.
Koray Akbulut et al., "Suppression of Seismic Interference Noise on Gulf of Mexico Data", SEG Technical Program Expanded Abstracts, 1984, pp. 527-529.
Luis L. Canales, "Random Noise Reduction", SEG Technical Program Expanded Abstracts, 1984, pp. 525-527.
M. Wang et al., "Advanced Deblending Scheme for Independent Simultaneous Source Data", ASEG-PESA-AIG 2016 25th Geophysical Conference & Exhibition, Aug. 21-24, 2016, Adelaide, Australia, pp. 564-568.
Necati Gulunay, "Two different algorithms for seismic interference noise attenuation", The Leading Edge, Feb. 2008, pp. 176-181.
Ping Wang et al., "Fast progressive sparse Tau-P transform for regularization of spatially aliased seismic data", SEG Denver 2014 Annual Meeting, Oct. 26-31, 2014, Denver, Colorado, pp. 3589-3593.
Ray Abma et al., "An Overview of BP's Marine Independent Simultaneous Source field trials", SEG Las Vegas 2012 Annual Meeting, Nov. 4-9, 2012, pp. 1-5.
S. Jansen, et al., "Two Seismic Interference Attenuation Methods Based on Automatic Detection of Seismic Interference Moveout", 75th EAGE Conference & Exhibition incorporating SPE EUROPEC 2013, London, United Kingdom, Jun. 10-13, 2013.
T. Elboth et al., "Advances in Seismic Interference Noise Attenuation", 79th EAGE Conference & Exhibition 2017, Jun. 12-15, 2017, Paris, France.
Thomas Elboth et al., "Time-frequency seismic data de-noising", Geophysical Prospecting, May 2010, pp. 441-453, vol. 58, No. 3.
Zhigang Zhang et al., "Seismic interference noise attenuation based on sparse inversion", SEG New Orleans Annual Meeting, Oct. 18-23, 2015, New Orleans, Louisiana, pp. 4662-4666.
T. Elboth, "Coordinating Marine Acquisitions to Tackle Seismic Interference Noise," 79th EAGE Conference & Exhibition 2017, Jun. 12-15, 2017, Paris, France.

\* cited by examiner

FIG. 12  $D_d$
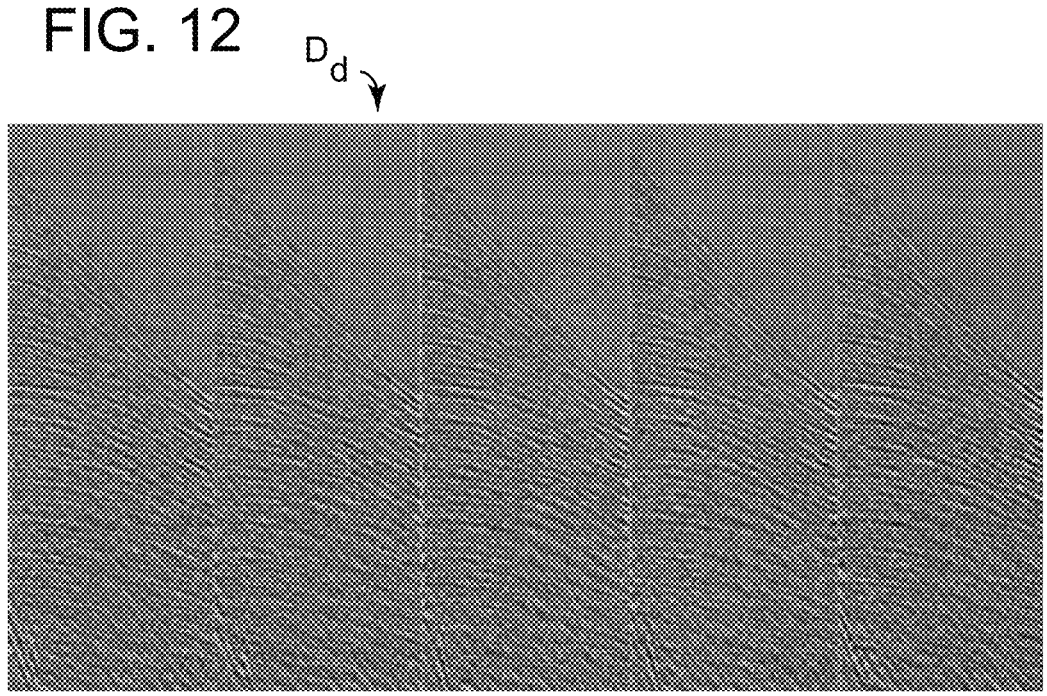
FIG. 13
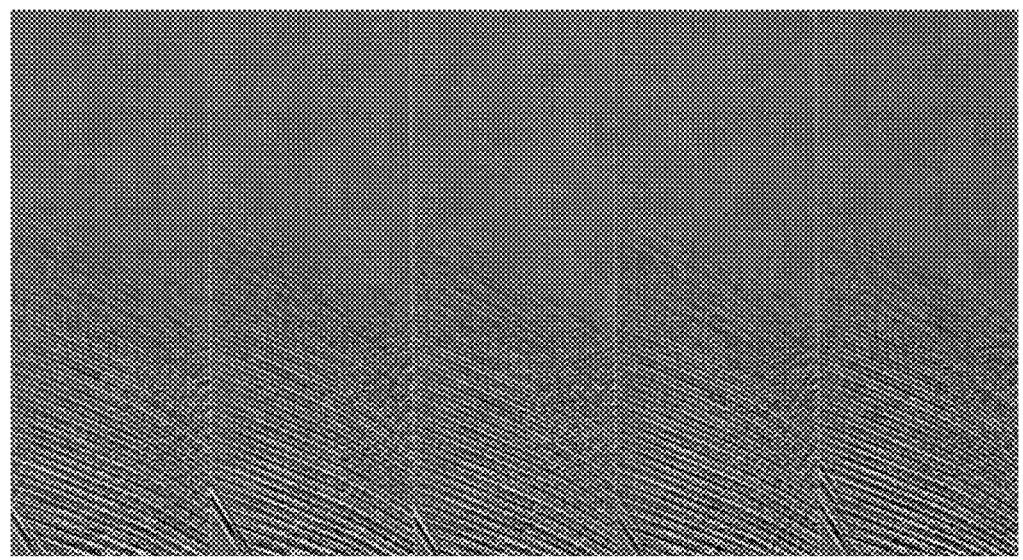

FIG. 16
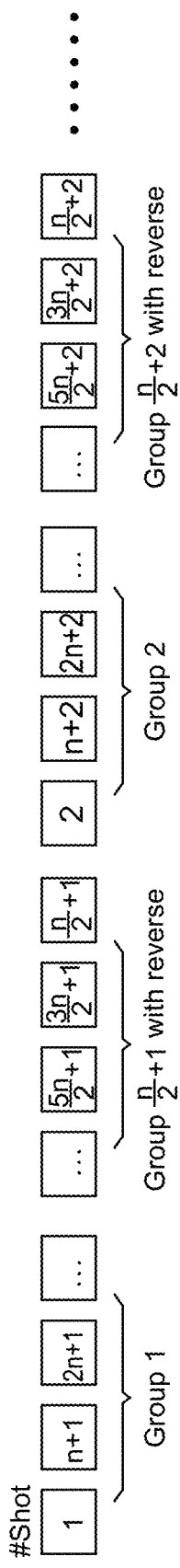
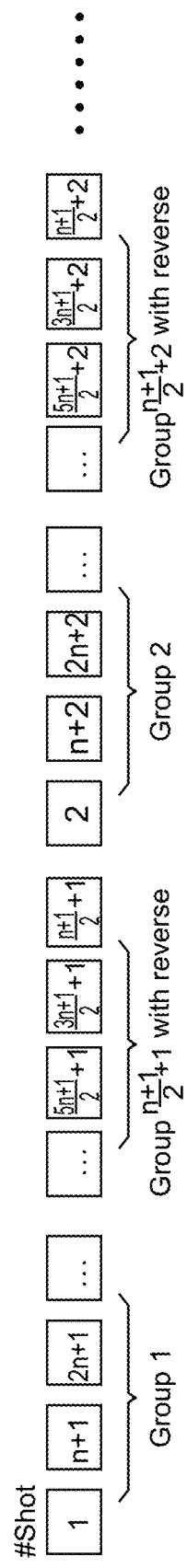

DEVICE AND METHOD FOR MODEL-BASED DEBLENDING

CROSS-REFERENCE TO RELATED APPLICATIONS

The present application is related to and claims the benefit of priority of U.S. Provisional Applications 62/445,422 filed Jan. 12, 2017, and 62/433,322 filed Dec. 13, 2016, the entire contents of which are incorporated herein by reference.

BACKGROUND

Technical Field

Embodiments of the subject matter disclosed herein generally relate to methods and systems and, more particularly, to mechanisms and techniques for attenuating seismic interference (SI) noise, which is shot-to-shot coherent. The new technique can be combined/integrated with existing deblending methods to attenuate the SI noise.

Discussion of the Background

Seismic data acquisition and processing techniques generate a profile (image) of the geophysical structure (subsurface) of the earth. While this profile does not provide an accurate location for oil and gas, it suggests, to those trained in the field, the presence or absence of oil and/or gas. Thus, providing a high-resolution image of the subsurface is an ongoing process for the exploration of natural resources, including, among others, oil and/or gas.

During a seismic gathering process, as shown for instance in the marine case in FIG. 1, a vessel 110 tows plural detectors 112, which are disposed along a cable 114. Cable 114 and its corresponding detectors 112 are sometimes referred to, by those skilled in the art, as a streamer 116. Vessel 110 may tow plural streamers 116 at the same time. The streamers may be disposed horizontally, i.e., lie at a constant depth $z_1$ relative to the ocean surface 118. Also, the plural streamers 116 may form a constant angle (i.e., the streamers may be slanted) with respect to the ocean surface as disclosed in U.S. Pat. No. 4,992,992, the entire content of which is incorporated herein by reference. In one embodiment, the streamers may have a curved profile as described, for example, in U.S. Pat. No. 8,593,904, the entire content of which is incorporated herein by reference.

Still with reference to FIG. 1, vessel 110 may also tow a seismic source 120 configured to generate acoustic waves 122a. Acoustic wave 122a propagates downward and penetrates the seafloor 124, eventually being reflected by a reflecting structure 126 (reflector R). Reflected acoustic wave 122b propagates upward and is detected by detector 112. For simplicity, FIG. 1 shows only two paths 122a corresponding to the acoustic waves. Parts of reflected acoustic wave 122b (primary) are recorded by various detectors 112 (recorded signals are called traces), while parts of reflected wave 122c pass detectors 112 and arrive at the water surface 118. Since the interface between the water and air is well approximated as a quasi-perfect reflector (i.e., the water surface acts as a mirror for acoustic waves), reflected wave 122c is reflected back toward detector 112 as shown by wave 122d in FIG. 1. Wave 122d is normally referred to as a ghost wave because it is due to a spurious reflection. Ghosts are also recorded by detector 112, but with a reverse polarity and a time lag relative to primary wave 122b if the detector is a hydrophone. The degenerative effect that ghost arrival has on seismic bandwidth and resolution is known. In essence, interference between primary and ghost arrivals causes notches, or gaps, in the frequency content recorded by detectors.

Multiple-sources (more than 2) marine towed streamers acquisition has been attracting increased interest in the industry due to the prospect of denser data sampling, particularly in the crossline direction, at a similar or cheaper cost compared to a conventional setup. However, due to shorter temporal shot spacing, final seismic data quality depends heavily on the processing ability to separate the energy from different sources (either belonging to a same seismic survey or to two or more seismic surveys; this step is often referred to as deblending). In the following, the term SI noise or cross-talk noise is used herein to include not only seismic interference noise from seismic sources belonging to different seismic surveys, but also seismic interference noise from seismic sources belonging to a same seismic survey, as illustrated in FIG. 1.

The existing deblending flows depend heavily on the randomness of the cross-talk noise in the common channel domain in order to separate the noise from the signal. The common channel domain refers to seismic data recorded by a single sensor or group of sensors (that is processed as a single sensor) from a streamer as it crosses the surveying area. When randomness is low, the cross-talk noise becomes semi-coherent in all domains and, hence, poses a significant challenge to the existing deblending flows.

Thus, there is a need to develop new model-based deblending schemes, which supplement previously proposed deblending schemes.

SUMMARY

According to an embodiment, there is a method for removing cross-talk noise from seismic data and generating an image of a surveyed subsurface. The method includes receiving input seismic data D generated by firing one or more seismic sources so that source energy is overlapping, and the input seismic data D is recorded with seismic sensors over the subsurface; generating a cross-talk noise model N by replacing at least one original shot gather with a reconstructed shot gather; subtracting the cross-talk noise model N from the input seismic data D to attenuate coherent cross-talk noise to obtain processed seismic data $D_p$; deblending the processed seismic data $D_p$ with a deblending algorithm to attenuate a residual noise to obtain deblended seismic data $D_d$; and generating the image of the subsurface based on the deblended seismic data $D_d$.

According to another embodiment, there is a computing device for removing cross-talk noise from seismic data and generating an image of a surveyed subsurface. The computing device includes an interface configured to receive input seismic data D generated by firing one or more seismic sources so that source energy is overlapping, and the input seismic data D is recorded with seismic sensors over the subsurface; and a processor connected to the interface. The processor is configured to generate a cross-talk noise model N by replacing at least one original shot gather with a reconstructed shot gather; subtract the cross-talk noise model N from the input seismic data D to attenuate coherent cross-talk noise to obtain processed seismic data $D_p$; deblend the processed seismic data $D_p$ with a deblending algorithm to attenuate a residual noise to obtain deblended seismic data $D_d$; and generate the image of the subsurface based on the deblended seismic data $D_d$.

According to another embodiment, there is a non-transitory computer readable medium including computer executable instructions, wherein the instructions, when executed by a processor, implement instructions for determining an image of a surveyed subsurface according to the methods discussed herein.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 12 shows the deblended data when using the mixed gathers;

FIG. 13 illustrates the coherent shot-to-shot noise removed from the gathers;

FIG. 16 illustrates a method for mixing the groups of FIG. 15 for deblending;

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
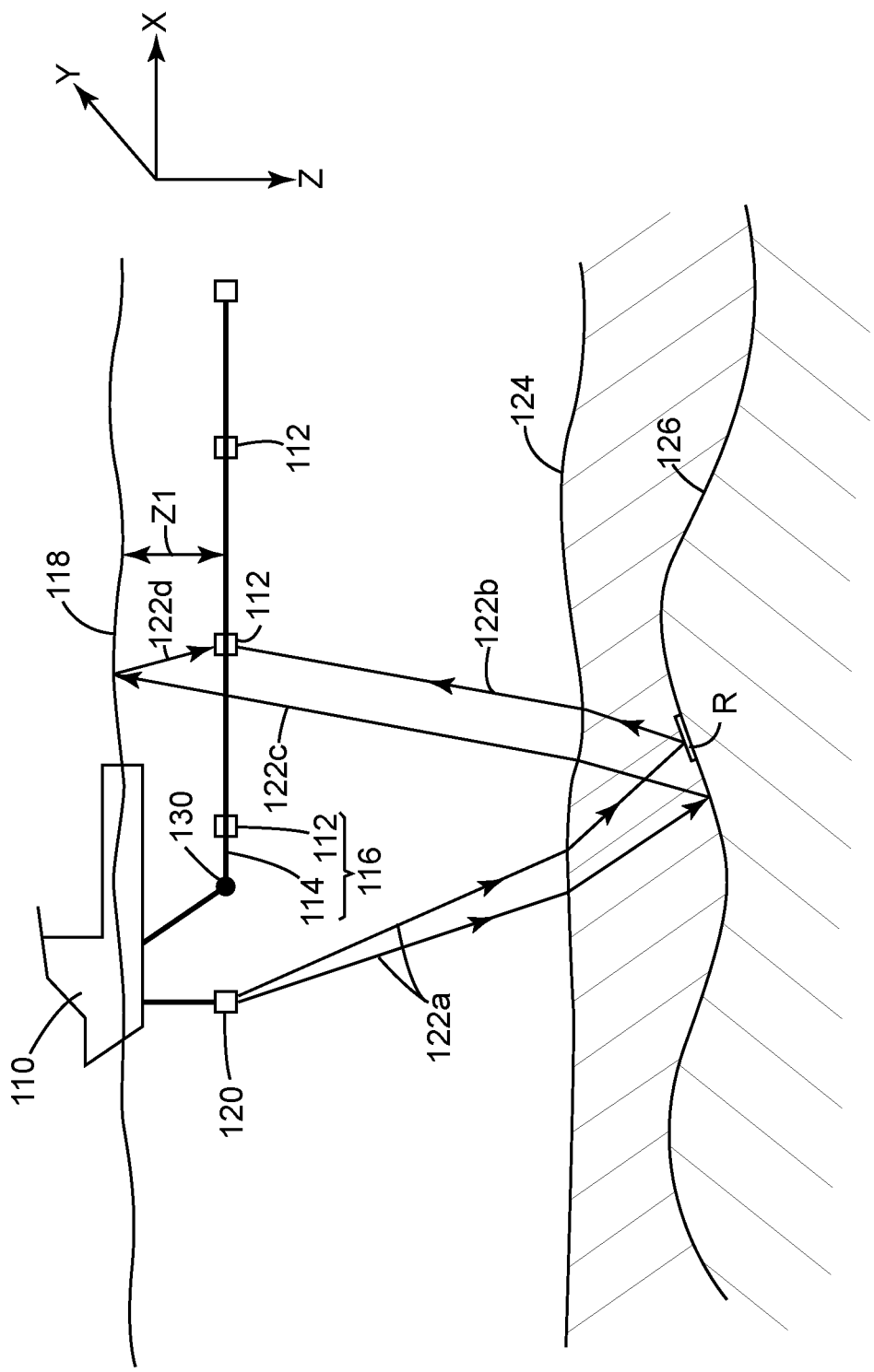
FIG. 1 is a schematic diagram of a conventional marine seismic data acquisition system having a horizontal streamer.

As noted in the Background section, there is a problem with the current seismic survey configuration due to the SI noise and the lack of the existing processing methods for removing the low-frequency broadband SI noise. To increase common mid-point (CMP) fold and spatial data sampling, particularly in the crossline direction for towed streamers data, one solution is the use of simultaneous sources, as described by Poole et al. (2014) and Peng et al. (2013). An alternative approach to improve the crossline sampling is to increase the number of available sources beyond the conventional dual-sources acquisition (see, e.g., Hager et al. (2016)). For such a setup, the CMP spacing of a single offset (i.e., a distance between a seismic source and a given seismic receiver) along the acquisition direction (X in FIG. 1) is given by $(d_s \times n_s)/2$ where $d_s$ is the spacing between adjacent shots and $n_s$ is the number of sources in a given seismic survey. Therefore, a larger number $n_s$ of sources could lead to aliasing in the acquisition direction. To overcome this, the spacing $d_s$ is reduced such that $(d_s \times n_s)/2$ is comparable with conventional dual-sources acquisition (e.g., less than 25 m). Note that a "source" is understood herein to refer to a source array that includes plural individual source elements, each element being an air gun or a vibratory source.

However, the shorter temporal spacing between adjacent shots leads to higher SI noise in the recorded data. Hence, the success of such acquisition depends heavily on an effective processing algorithm to separate the energy from the different sources. This process is called deblending.

There are many known deblending flows in the literature, see for example, Peng et al. (2013), Wang et al. (2016), and Poole et al. (2014), and also see the references within these works. Most of the deblending flows make use of the randomness of the cross-talk noise in the common channel domain for predicting the primary signal. The primary signal is then used to model the cross-talk noise and the cross-talk noise is then subtracted directly from the recorded seismic data. However, these deblending flows normally require the cross-talk noise to be sufficiently random.

For broadband processing down to 2 Hz, this means a dithering time when shooting the sources of more than 250 ms as discussed in Abma et al. (2012). This large dithering time is not always achievable for a multiple-source acquisition system. To tackle cases of low-randomness in dithering time, the following embodiment generates a cross-talk noise model N, which is formed by reconstructing the primary signal using neighboring data, and removes the cross-talk noise N layer by layer from the recorded seismic data D. This step weakens the cross-talk noise N and reduces its coherency, paving the way for other deblending schemes to effectively remove the residual cross-talk noise and recover the leaked signal. In one application, an extension of the deblending scheme previously published by Wang et al. (2016) is discussed.

Figure 2:
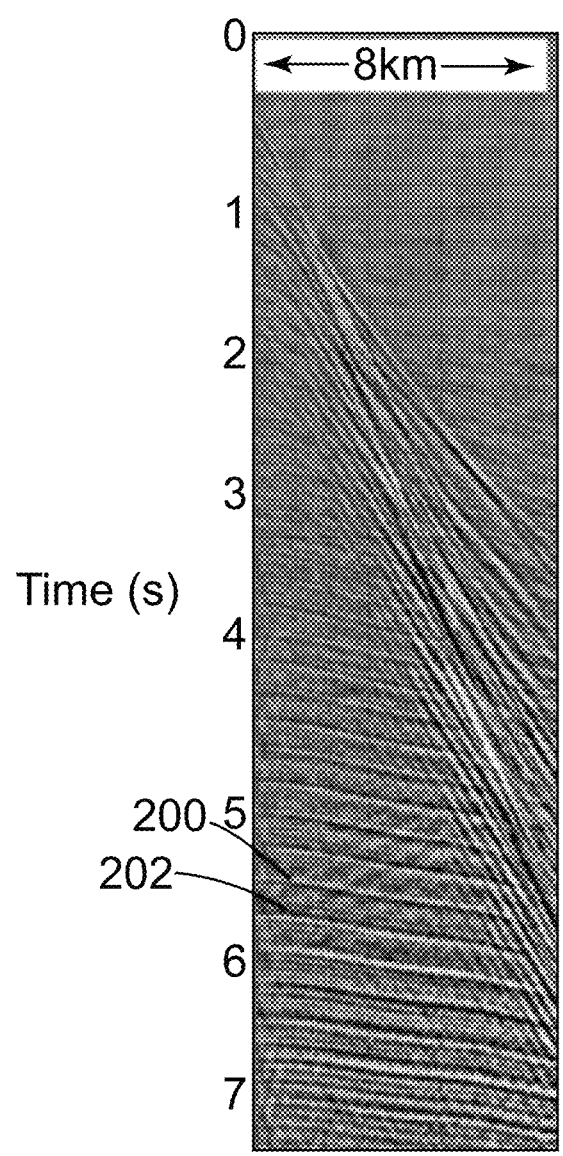
FIG. 2 shows recorded seismic data and coherent shot-to-shot noise.

Due to the low average dithering time in the traditional seismic data, the low-frequency energy will be coherent in all domains, thus forming well defined bands on the, for example, common receiver gathers (see bands 200 and 202 in FIG. 2). This property manifests itself into regions 300 of strong signal-to-noise ratio, just before and after the water bottom, as illustrated in the common channel of FIG. 3.

Figure 3:
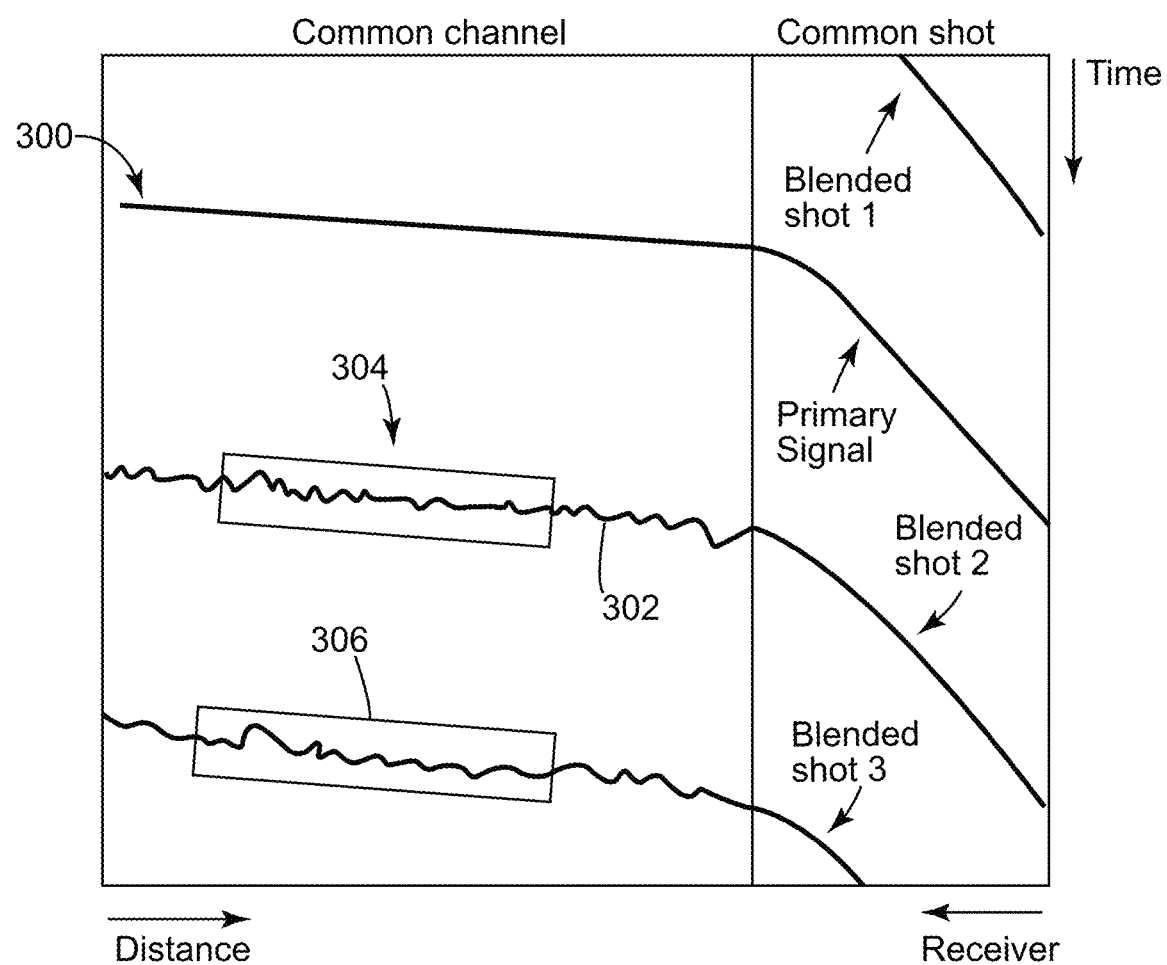
FIG. 3 illustrates seismic data having coherent shot-to-shot noise, in the common channel and common shot domains.

From the schematics of a typical multi-source seismic data illustrated in FIG. 3, it can be seen in the common channel domain (this is the domain formed by the traces recorded by a receiver at a given position along a streamer, i.e., the same channel) that just before and after the water bottom two-way-time (TWT) 300, the signal-to-noise ratio is good. After this zone 300, the next shots energy (for example, from blended shot 2 or blended shot 1) is present, which degrades the signal-to-noise ratio and this zone 302 has semi-coherent noise 304 and 306. Note that this figure shows only three blended shots and a primary signal that corresponds to the ocean bottom. By making use of the relatively clean data 300 before the noisy bands 304 and 306, according to this embodiment, it is possible to model the cross-talk noise N and remove it from the recorded seismic data D. In this regard, the recorded seismic data D may be written as:

$$D=S+N=S+\Gamma S, \quad (1)$$

where S is the individual source response and $\Gamma$ is a time delay operator. The cross-talk noise model N is nothing else than the individual source response corrected with the appropriate time delay operator, which is known from the acquisition process.

Figure 4:
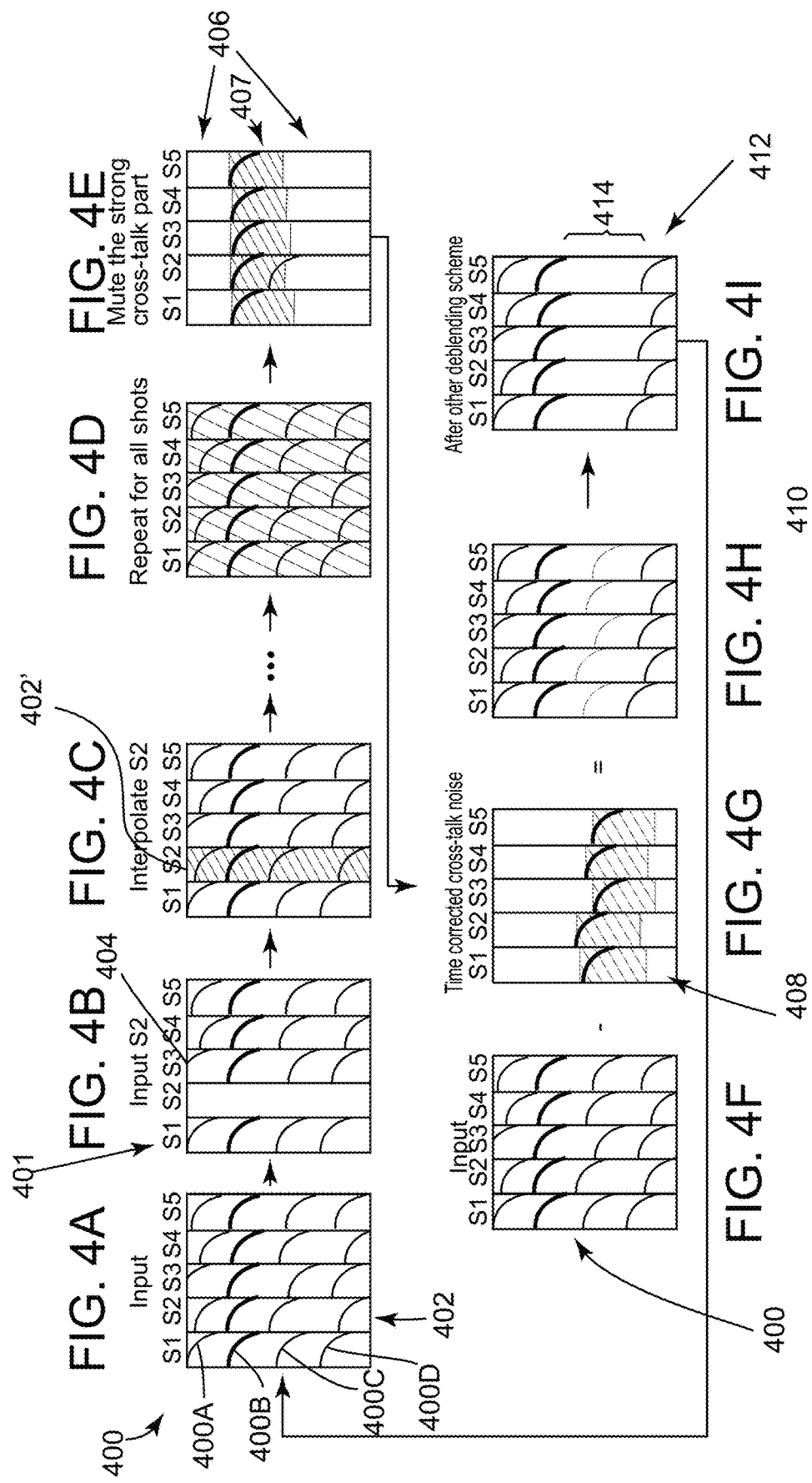
FIGS. 4A-4I schematically illustrate a method for breaking the coherency of the shot-to-shot noise by reconstructing the gathers.
Figure 5:
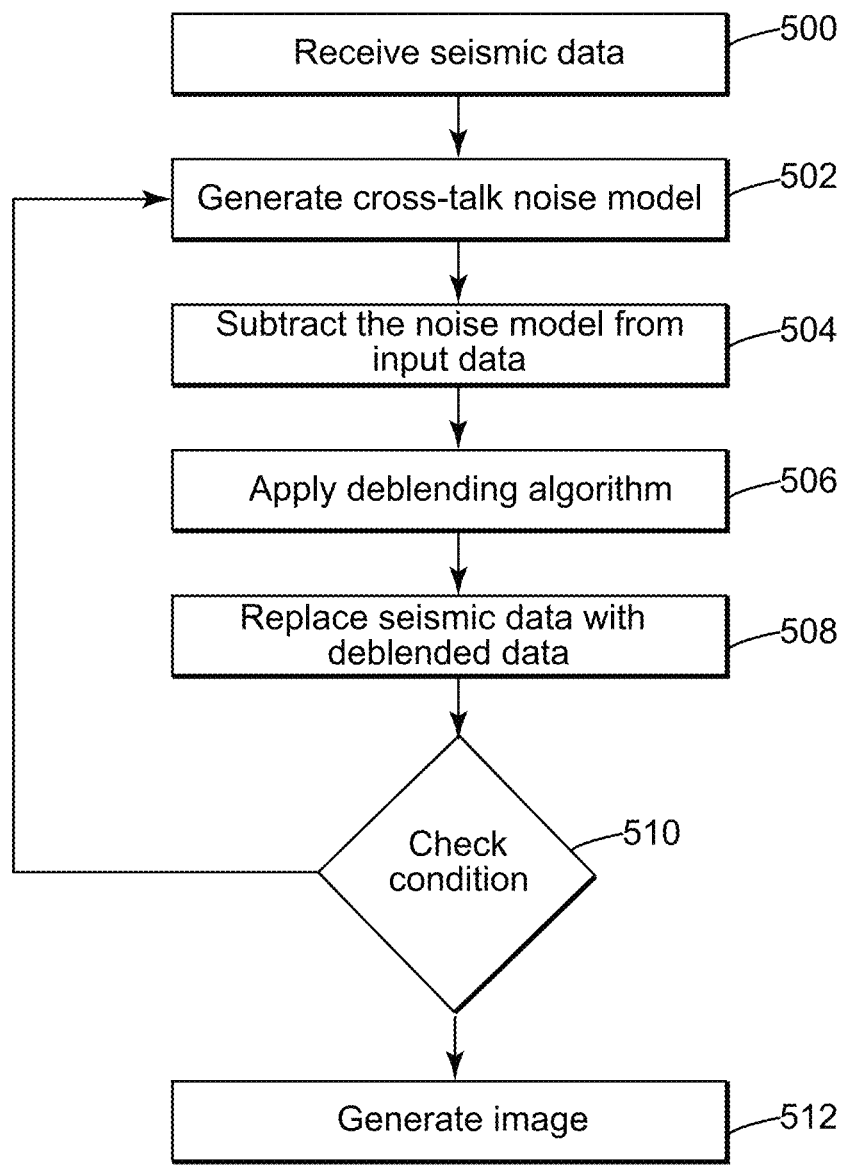
FIG. 5 is a flowchart of a method for deblending the seismic data by breaking the coherency of the shot-to-shot noise.

A schematic of this model-based deblending (MBD) flow is shown in FIGS. 4A-4I, and now discussed. The MBD flow includes a first step 500 (see flow chart of FIG. 5) of receiving the recorded seismic data D 400, which is also schematically illustrated in FIG. 4A. Note that FIG. 4A schematically shows the energy detected by receivers (e.g., on one streamer or receiver line) for five different shots $S_1$ to $S_5$. These shots may be from a same source or from different sources. Each of the shots $S_1$ to $S_5$ are shown including the blended shot 1 400A, the primary signal 400B, the blended shot 2 400C, and the blended shot 3 400D. In step 502, the cross-talk noise model N (also called SI noise model) is constructed. Unlike the previous flows, where the coherent signal is used to estimate the primary signal model, in the MBD flow, a shot 402 (or receiver gathers) for each individual source $S_i$ is sequentially dropped (see FIG. 4B) and the dropped gather 402 is mathematically reconstructed using the remaining gathers 401, 404, etc. as schematically illustrated in FIG. 4C. The reconstructed gather 402' illustrated in FIG. 4C can be generated based on the adjacent gathers 401 and 404, or another combination of gathers. In one application, more than one gather is reconstructed at the same time. It is noted that adjacent gathers 401 and 404 are time shifted relative to the dropped gather 402 by about 1 to 20 s, which means that while the change in the primary component of the seismic data is substantially zero from gather to gather, the change in the cross-talk noise may be substantial, thus achieving a high randomness, i.e., destroying the coherency of the cross-talk noise especially in the region of strong signal-to-noise ratio (i.e., just before and after seabed reflection of primary energy 400B). The reconstruction of the gather 402' can be achieved by either simple interpolation (in time-space (TX), frequency-space (FX), frequency-slope (FP), slope-intercept (TauP), curvelet domain, etc.) or higher-end sparse interpolation and inversion techniques (in TX, FX, FP, TauP, curvelet domain etc.). Other methods may be used to reconstruct the gather 402', for example, to take it from a previous seismic survey or to add another gather from an adjacent survey line, as will be discussed later.

FIG. 4D shows that during this step 502, each receiver gather is dropped and reconstructed based on the adjacent receiver gathers until all the shots are processed. Note that the reconstruction of each receiver gather can be made based on the original neighboring gathers, reconstructed neighboring gathers, or a combination of them. The strongest (highest) interference noise 406 is muted away as illustrated in FIG. 4E, and only the region 407 with the highest signal-to-noise ratio is left. This region 407 corresponds to the primary signal 400B in FIG. 4A. This strong signal-to-noise ratio region 407, which corresponds to an individual source response, may be time aligned (i.e., apply the time delay operator F to the individual source response S 407) based on the firing time for the blended energy, to obtain the cross-talk noise model N 408 as illustrated in FIG. 4G. Note that the strong signal-to-noise ratio region 407 in FIG. 4E has become the noise model N 408 in FIG. 4G by the alignment operation, consistent with equation (1).

In typical coherent signal method, it is often difficult to distinguish between the seismic signal and the cross-talk noise in a region of strong signal-to-noise ratio. The cross-talk noise model N is thus often contaminated with the primary signal 400B, leading to excessive signal leakage in the low signal-to-noise ratio region. As the primary energy is more coherent compared to the cross-talk noise, this novel MBD flow ensures that the primary signal 400B is reconstructed more accurately compared to the semi-coherent cross-talk noise N, hence significantly reducing the chances of primary contamination in the cross-talk noise model. A possibly cheaper way to obtain the reconstructed data is to use the adjacent shot directly, i.e., to replace a given shot with an adjacent shot data without any mathematical calculations. This works better when the shot interval shrinks making the primary data from adjacent shots more similar to each other.

In step 504, the noise model N 408 is subtracted from the input seismic data D 400 to reduce coherent cross-talk noise, as illustrated in FIGS. 4F and 4G, which results in a processed seismic data set $D_p$ 410 (see FIG. 4H) having low cross-talk noise in a given layer. Note that the input seismic data D 400 has been generated by the plurality of sources emitting seismic waves, which were reflected from plural layer interfaces in the subsurface, and the reflected seismic waves were recorded with the seismic receivers towed by the seismic vessels.

The subtraction step illustrated in FIGS. 4F and 4G can be either direct subtraction or adaptive subtraction in one of the domain transforms TX, FX, FP, TauP, curvelet domain etc. The subtraction can also be carried out in common shot, common channel, common mid-point or other domains. The shot firing time correction shown in FIG. 4G, prior to the subtraction step, may also be applied for the input seismic data D or cross-talk noise model N or both. The shot firing time can be corrected for the primary shot or the blended shot with any value of constant time shift. If adaptive subtraction is utilized for this step, then data muting might not be necessary.

After step 504, the energy and coherency of the cross-talk noise N has been reduced to a manageable level (due to the reconstruction of gather 402') for other deblending scheme to further attenuate cross-talk noise and recover the leaked signal. Thus, at this time, a known deblending method may be applied in step 506 to the processed data $D_p$ 410, from which a residual noise is removed to generate deblended seismic data $D_d$ 412, as illustrated in FIG. 4I.

It is noted that after step 504, one subsurface layer (e.g., that corresponding to the blended shot 2 in FIG. 3 or FIG. 4A) of strong cross-talk noise is removed, revealing a longer section 414 of good signal-noise-ratio, as illustrated in FIG. 4I. At this stage, the original seismic data D is replaced in step 508 with the deblended seismic data $D_d$ 412, and if desired, it is possible to go back to step 502 to repeat the above noted algorithm, and to recursively remove the remaining layers of cross-talk noise. This layer stripping flow continues until a condition is fulfilled in step 510. This condition can be, for example, that the calculated cross-talk noise model N is below a certain threshold. If the condition is fulfilled, the process advances to step 512, where an image of the surveyed subsurface is generated based on the deblended data $D_d$. The method discussed above may be modified to loop steps 502 and 504 to partially remove all cross-talk noise layers. Step 506 of applying the deblending algorithm can be applied after one or more layers of cross-talk noise is removed by using steps 502 and 504.

An alternative solution to the cross-talk noise model discussed above, which replaces the recorded seismic data with reconstructed data, in one embodiment is possible to enhance the recorded seismic data corresponding to a sailing line with seismic data from neighboring or vintage sail-lines, to guide the denoising. This new technique can be combined/integrated with existing deblending methods to attenuate cross-talk noise as now discussed.

As previously discussed, a frequently encountered problem in seismic data is the presence of various types of coherent noise and in particular, marine seismic interference (SI) noise, also called cross-talk noise herein. The cross-talk noise is encountered when several seismic vessels operate simultaneously and in close proximity. Historically, if the amplitude and/or move-out of the cross-talk noise exceed certain limits, the operating vessels have commenced time-sharing. The operating vessels have been known to commence time-sharing at distances up to 100 km. However, as a rough guideline, cross-talk noise is often seen as problematic when vessels are closer than 40 km, which is often the case in busy summer seasons offshore Northern Europe and in the Gulf of Mexico. Needless to say, timesharing is costly and sometimes also leads to significant delays in survey completion. Also, for some seismic surveys, cross-talk from vessels belonging to the same seismic survey has become a problem.

In the last few years, through processing improvement and by better vessel coordination, the amount of downtime (timesharing), e.g., in the North Sea during the summer season, has been reduced as discussed in Elboth et al. (2017).

However, experience has shown that it is the shot-to-shot coherent and broadside (coming from the side of the streamer) cross-talk noise that remains challenging. This type of cross-talk noise appears kinematically very similar to the seismic reflection data. Unfortunately, the cross-talk noise does often not contain any useful information since it basically is only made up of energy that reverberates in the water column.

Some common type of cross-talk noise attenuation algorithms used in the industry is based on the realization that coherent energy in the shot domain often appears as random noise in other domains (Larner et al. (1983)). Random noise attenuation tools like f-x prediction filtering (Canales 1984) or thresholding methods (Elboth et al. (2010)) are then applied to the data, before it is sorted back to the shot domain. This cross-talk noise attenuation approach has been used by Akbulut et al. (1984) and more recently by Gulunay (2008). It is noted that nearly all cross-talk attenuation algorithms are currently applied to source-streamer combinations. This means that they are basically 2D algorithms.

Since the origin of the cross-talk noise is normally 10-100 km away (other values are also possible), it tends to be seen on the receivers as nearly planar waves. In this regard, FIG. 2 shows planar waves 200 and 202 that are sparse when transformed into the linear tau-p space.

Figure 6:
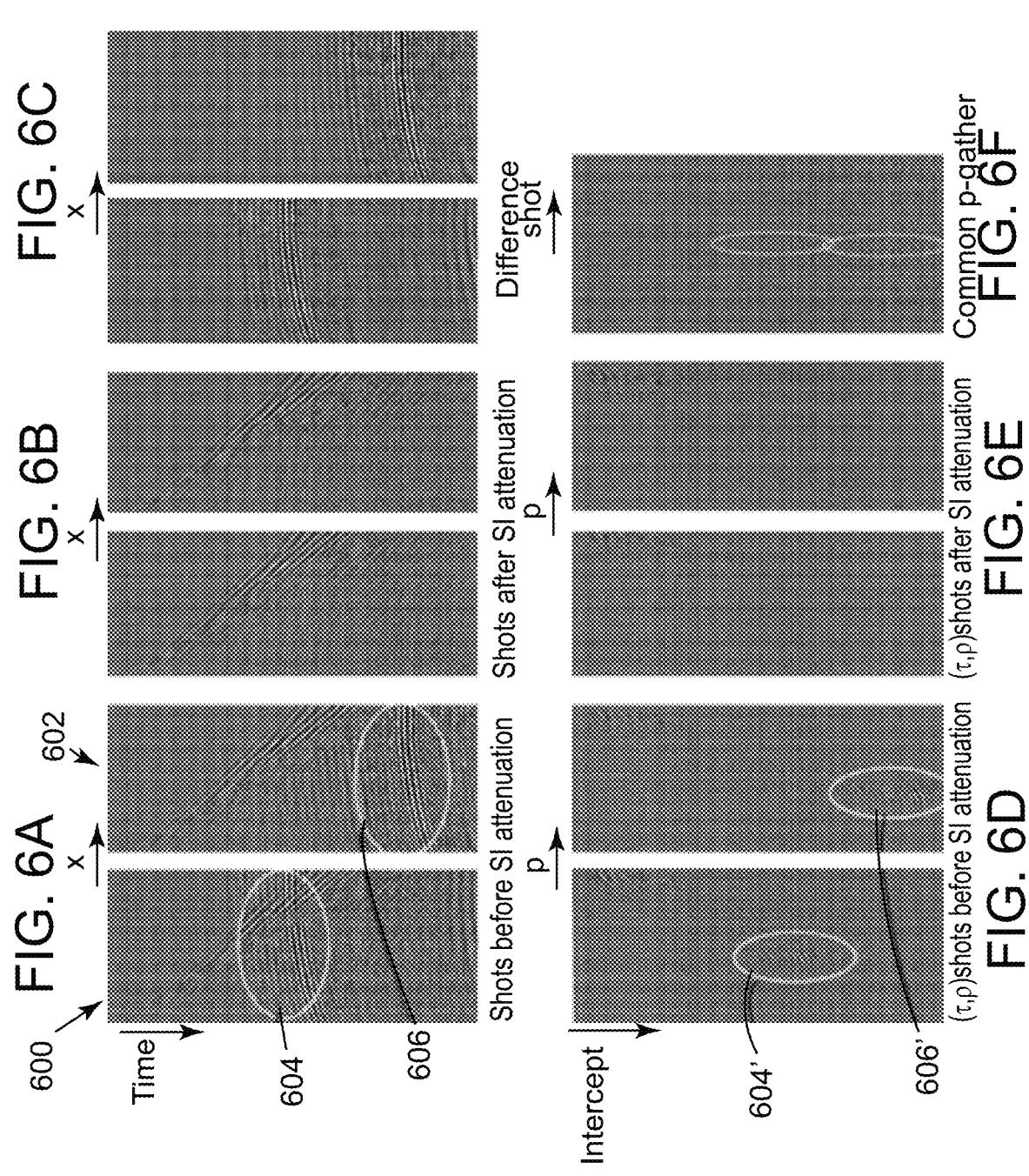
FIGS. 6A-6F illustrate how the non-coherent shot-to-shot noise is removed with a deblending algorithm.

A commonly used cross-talk attenuation workflow works in the following way: first, the source-streamer recorded data is 2D transformed into a Tau-P domain, and sorted according to p-values. In the Tau-P domain, a known random noise attenuation tool is applied, before the identified noise is sorted back to tau-p, inverse transformed and finally (adaptively) subtracted from the original data. This approach, illustrated in FIGS. 6A-6F, is appealing, because it takes advantage of the relative linearity of seismic interference compared to the reflection seismic data. Implicitly, the algorithm relies on some shot-to-shot randomness in the arrival time of the cross-talk noise. In this regard, FIG. 6A shows two consecutive shot gathers 600 and 602 before cross-talk noise attenuation. The substantially parallel planar waves regions 604 and 606 are easily identifiable in the figure. Because the regions 604 and 606 include cross-talk noise with a high randomness, it is easy to remove the noise with traditional methods, a result of which is shown in FIG. 6B. It is noted that the noise regions 604 and 606 are mainly removed from the gathers. FIG. 6C shows the difference between the gathers before attenuation (FIG. 6A) and after attenuation (FIG. 6B).

A traditional deblending method transforms the gathers 600 and 602 to the tau-p space as illustrated in FIG. 6D. Notice how the near linear cross-talk regions 604 and 606 map into a relative small area 604' and 606' in the tau-p space, and how the shot-to-shot randomness in the cross-talk noise arrival time relates to the 'random noise' that appears in the common-p sorted gather. In this case the vessel (source) that generated the cross-talk was about 10 km away and broadside (i.e., the noise is coming from a side of the streamer, e.g., substantially along the cross-line direction) from the main recording vessel. FIG. 6E shows the transformed data after cross-talk attenuation and FIG. 6F shows the common p-gather.

Figure 7:
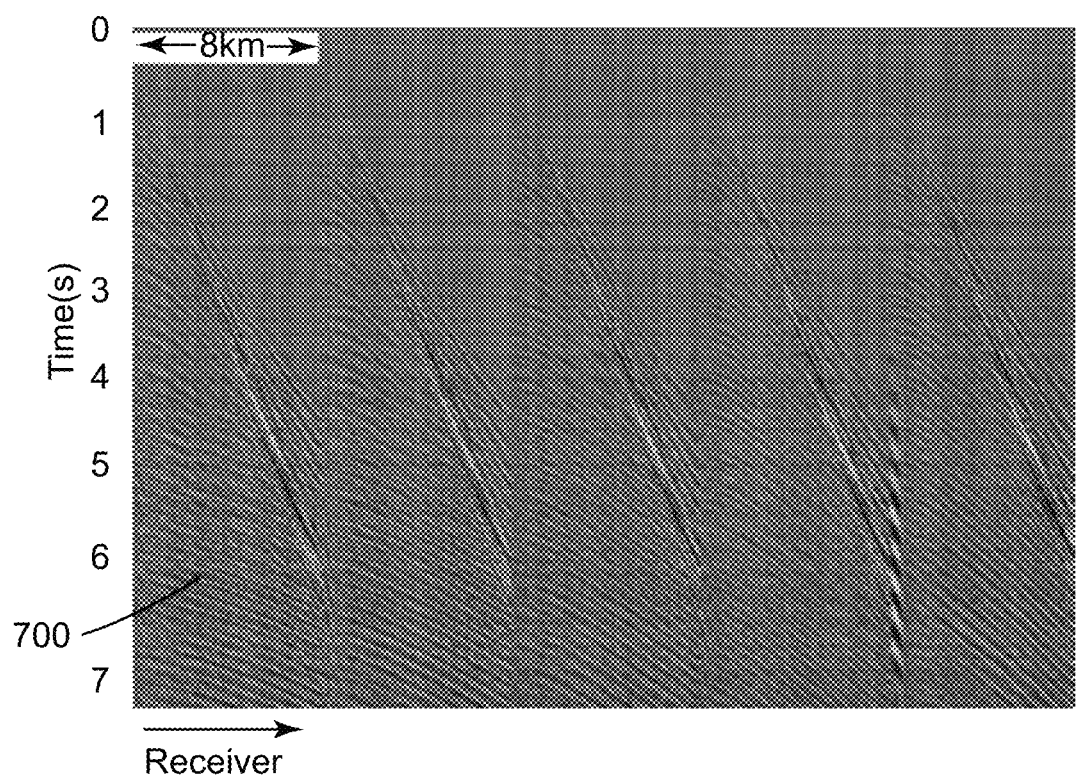
FIG. 7 illustrates the coherency of shot-to-shot noise in adjacent gathers recording during a seismic survey.

More details on a modern implementation of this basic algorithm can be found in, for example, Wang and Nimsaila (2014) and in Zhang and Wang (2015). The main problem faced by all these traditional approaches is that broadside and shot-to-shot coherent cross-talk noise cannot easily be randomized and isolated. An example of such data is shown in FIG. 7. FIG. 7 shows that the planar waves 700 associated with the cross-talk noise are similar (coherent) from gather to gather (the figure shows five consecutive gathers).

Without sufficient randomization in the arrival time of the cross-talk noise, the whole traditional denoising approach breaks down. The novel method discussed in the following embodiment randomizes the cross-talk noise that is shot-to-shot coherent.

Figure 8:
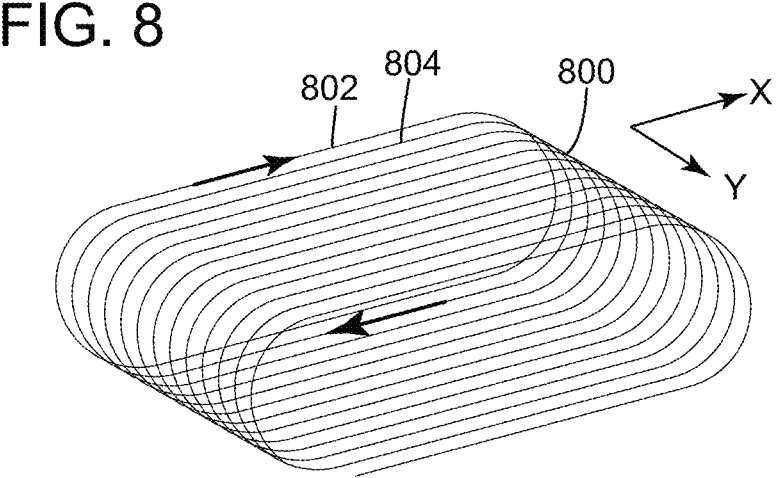
FIG. 8 illustrates the sail-lines followed by a vessel during a seismic survey.

For understanding this novel method, reference is made to a 3D acquisition survey. During such survey, the seismic data is acquired in a so called race track pattern, as illustrated in FIG. 8. This means that the vessel that tows the streamers follow parallel sail lines 802, changing the direction of the line each time the vessel reaches the border of the survey area 800. The purpose of this arrangement is to minimize the turn time, and thereby maximize acquisition efficiency. This means that most lines 802 will have one or two neighboring/adjacent lines 804 that are parallel, and acquired in the same direction X.

As mentioned above, the cross-talk noise is sometimes shot-to-shot coherent along a sail line 802, and this kind of noise is difficult to attenuate in processing. Neighboring streamers from within another sail-line 804 will also normally be "seeing" the same noise. With, for example, 100 m streamer separation, broadside cross-talk noise is just 100 m:1500 m/sec=0.0667 s delayed between two neighboring streamers. This is normally not enough to break any shot-to-shot coherent cross-talk noise.

However, it is highly unlikely that recorded seismic data from neighboring sail-lines (adjacent sail-lines 802 and 804) will have shot-to-shot coherent cross-talk noise, when seen in the cross-line direction Y (direction perpendicular to the advancing direction of the vessel).

Thus, the present embodiment is based on the observation that earth's characteristics recorded along two neighboring sail lines are similar while cross-talk noise along the same two neighboring sail lines are different, i.e., not coherent. By selectively mixing in seismic data from one or more neighboring/adjacent sail-lines 804 into the seismic data associated with a given sail line 802, according to this embodiment, it is possible to improve the apparent randomness of the cross-talk noise, and thereby, enable existing noise attenuation workflows to better identify and attenuate any cross-talk noise. This happens while the primary signal is not significantly affected by the mixing of the seismic data.

Figure 9:
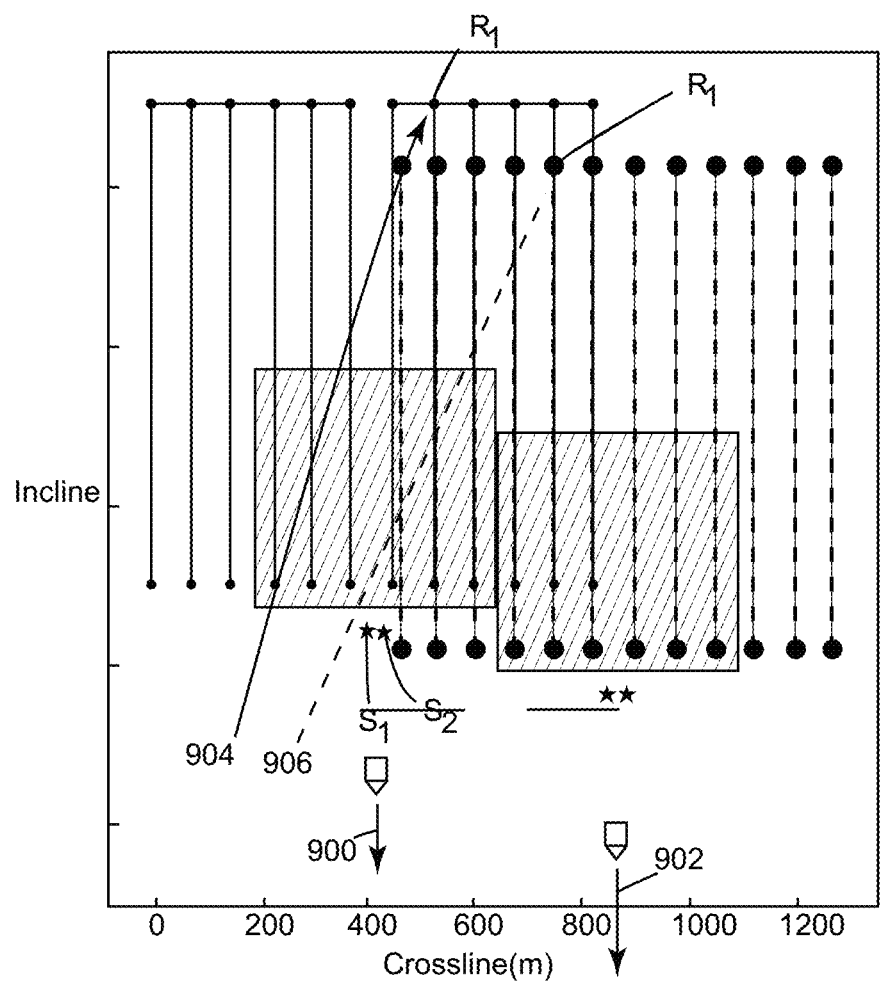
FIG. 9 illustrates the selection of similar source-streamer geometries for deblending the seismic data.

In a typical cross-talk noise attenuation flow, 20-50 consecutive source-streamer shot gathers in a sliding window are used for the cross-talk attenuation processing module(s). With a shot point interval (SPI) of 18.75 m, this gives an inline (2D) data aperture of 375-938 m. If it is assumed a streamer spread with 12 streamers separated by 75 m, FIG. 9 illustrates that source-streamer combinations from neighboring sail-lines 900 and 902 with similar relative geometry (absolute distance from the source $S_i$ to the receiver $R_i$) will typically be cross-line separated by 75 to 375 m. An example is given by the two streamer positions 904 and 906 on neighboring sail-lines 900 and 902 with the same relative geometry that are about 225 m apart. With 12 streamers having 100 m separation, the cross-line distance between "same geometry" source-streamer combinations would be between 100 and 500 m.

Thus, without extending the absolute data aperture, it is possible to "borrow" shots from a neighboring line (source-streamer), and mix/interleave these in to break up any shot-to-shot coherent cross-talk noise. Note that although it is preferred to borrow shots from neighboring line 902, it is also possible to borrow from a line that is farther away than line 902. In one embodiment, it is possible to borrow shots from more than one line, for example, one from line 902 and one from another line and to mix them with the shots from line 900.

In one embodiment, it is possible to interleave data from a source-streamer combination on line 900 with data from a source-streamer combination from a neighboring line 902 that has similar relative geometry, as illustrated by combinations 904 and 906 in FIG. 9. However, this is not an absolute requirement and source-streamer combinations having different geometries may be interleaved. In other words, it is possible to use source-streamer pairs having different geometries for two different sail-lines.

In this way, this embodiment effectively goes from 2D to 3D denoising, even though 2D Tau-P transforms are performed. This approach is referred to in the following as "line mixing," and it is based on two underlying assumptions:
(1) there is at least one neighboring sail-line, shot in the same direction, in addition to the sail-line that is being deblended; and
(2) the cross-talk noise acquired on this neighboring sail-line is significantly different from the cross-talk noise on the sail-line desired to be deblended.

During 3D acquisition, which is performed along a traditional race-track pattern as illustrated in FIG. 8, condition (1) is nearly always fulfilled, at least on one of the sides. Regarding condition (2), it has also been fulfilled on all datasets tested to date.

After the recorded seismic data D is interleaved as discussed above to obtain interleaved seismic data $D_i$ (which includes data sets from at least two different sail lines), a known denoising flow is applied to the interleaved data $D_i$ for determining the cross-talk noise model and the noise model is subtracted from the recorded seismic data D for obtaining the deblended seismic data $D_d$. Alternatively, it is possible that after the denoising flow has been applied to the interleaved seismic data $D_i$, then every other shots (the ones that were mixed in from the neighboring line) are removed, to obtain the deblended source-streamer line data.

Figure 10:
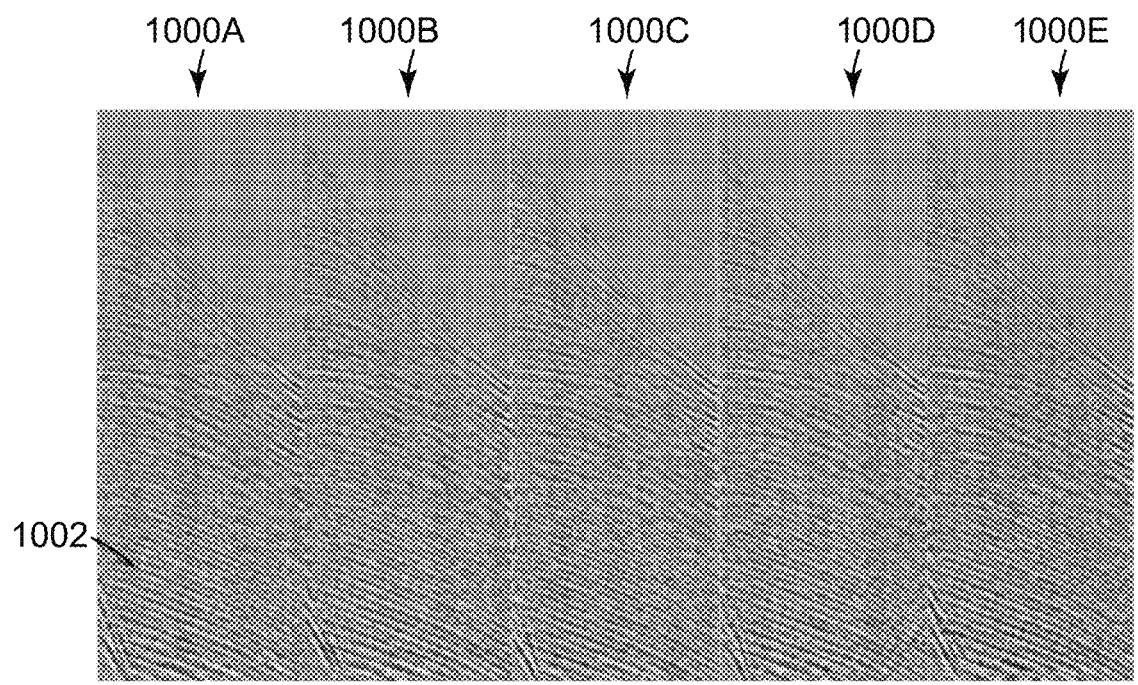
FIG. 10 illustrates plural gathers having coherent shot-to-shot noise.
Figure 11:
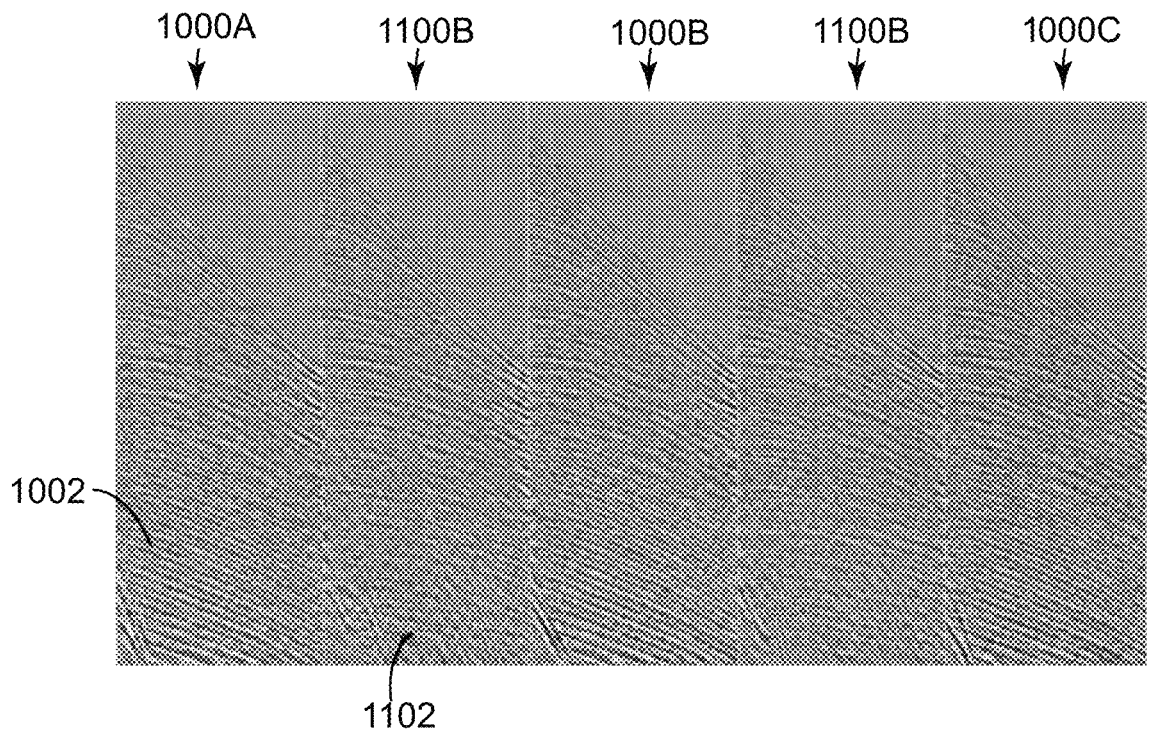
FIG. 11 illustrates a method of mixing the gathers from a first sail line with gathers from a second sail line to break the coherency of the shot-to-shot noise.

FIG. 10 shows seismic reflection data D with strong shot-to-shot coherent broadside cross-talk noise 1002. FIG. 10 shows five consecutive shot gathers 1000A to 1000E acquired from the same source-streamer combination, during a same sail line. FIG. 11 shows the mixed in data $D_i$ with original gathers 1000A to 1000C corresponding to a first sail-line and gathers 1100A and 1100B from a neighboring second sail-line, to break the shot-to-shot coherence of the cross-talk noise 1002. Note that gather 1000A from the first sail-line and gather 1100A from the second sail-line may correspond to the same acquisition geometry, as discussed above with regard to FIG. 9. Also note the lack of coherence for cross-talk noise 1002 associated with the first sail-line and cross-talk noise 1102 associated with the second sail-line.

FIG. 12 shows the data after denoising, i.e., the deblended data $D_d$, from which the borrowed seismic data from the second sail-line has been dropped, and FIG. 13 shows the cross-talk noise that was removed from the data shown in FIG. 12. The denoising results are nearly perfect, and are much better than the results obtained with the traditional methods. No cross-talk noise is visible in FIG. 12 (after denoise), and no seismic reflection data is visible in FIG. 13 (the difference plot).

The workflow described above may also be cascaded. That is, after having cleaned one source-streamer line, this now cleaned line may be used to clean another (neighboring) source-streamer.

Interleaving of data from an adjacent sail line can also be used on data within a sail-line. This means that the gathers 1100A and 1100B that are interleaved with the gathers 1000A and 1000B may belong to the same sail-line. In this regard, assume, for example, that firstly the data from an outer streamer (borrowing data from the outer streamer on the neighboring line) is deblended. It is possible then to use the now cleaned data and mix this cleaned data with the noisy data from the neighboring streamer within the same sail-line and thus, clean this noisy streamer. This process can be cascaded until all the source-streamer combinations within a sail-line are deblended.

The interleaving of data normally takes place with data from a neighboring sail-line. However, in one embodiment it may also be possible to interleave/mix in data from more than one neighboring sail-line, or from a legacy survey (e.g., an older survey of the same area), or in the case of 4D surveys, from another vintage. Interleaving data from another vintage has the benefit that it uses data which was acquired at almost exactly the same location. Another alternative is to interleave the data with a migrated and de-migrated copy of itself. A migration followed by a demigration process can effectively produce a "synthetic" gather with strongly attenuated cross-talk noise.

Figure 14:
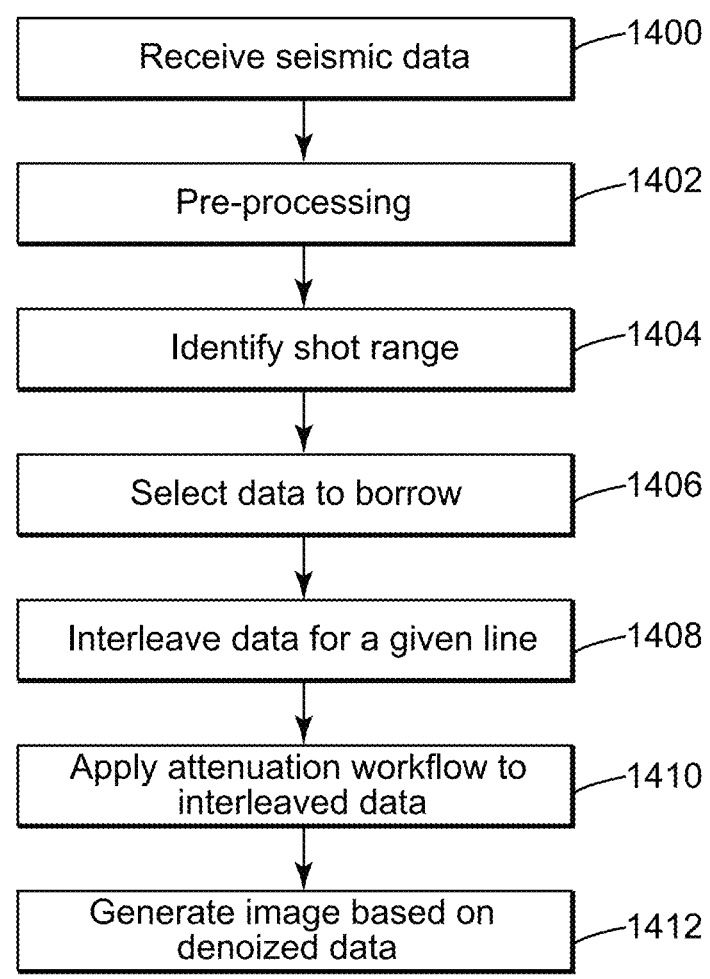
FIG. 14 is a flowchart of a method for deblending gathers that are mixed from different sail lines.

A process for denoising gathers that have very near continuous seismic interference noise is now discussed with regard to FIG. 14. It is assumed that all processing implicitly takes place on source-streamer gathers.

The method, which is run on one or more processors, starts with a step 1400 of receiving a first seismic dataset D1 and a second seismic dataset D2, where the first dataset D1 is acquired along a first sail line and the second seismic dataset D2 is acquired along a second sail line. The first sail line may be adjacent to the second sail line. The first seismic dataset D1 includes seismic reflection data from a main source and cross-talk data from an additional source. The first sail line may preferably have the same direction as the second sail line. While the first and second datasets may be acquired during a same seismic survey, it is possible that the second seismic dataset is a legacy survey or another vintage of a 4D survey. Optionally, in step 1402, various initial preprocessing (e.g., swell-noise attenuation, despiking, frequency lowcut, etc.) may be applied to the recorded first seismic dataset D1 and second seismic dataset D2. Although the deblending may be applied to the entire first seismic dataset D1, it has been observed that only a shot range during a given sail line is affected by cross-talk noise. Thus, to improve the speed of the process, in step 1404 is possible to identify the shot range that is affected by near continuous cross-talk. For example, if 1,000 shots are fired during a given sail line, it is possible that only shots 200 to 250 are affected by coherent cross-talk noise. Thus, this step identifies the shot range to be between 200 and 250 and uses the gathers corresponding to this shot range for further processing. In other words, the original set of recorded first seismic dataset D1 is reduced to the data corresponding to the affected shot range.

In step 1406, the seismic gathers to be "borrowed" from the same shot range from at least the second neighboring sail line are identified in the second dataset D2. Preferably, the neighboring sail line(s) should be acquired in the same direction as the sail line that is being processed. However, it is possible to also use data from neighboring sail line(s) having different directions.

For a given source-streamer, in step 1408, the original gathers (from D1) in the identified shot range along the processed sail line are mixed/interleaved with corresponding gathers (from D2) from one or more neighboring sail line(s) to generate the interleaved seismic data $D_i$. In one application, every other shot (one from the processed sail line and one from the neighboring sail line(s)) is interleaved. This step will break up the shot to shot coherence of the cross-talk noise. This step may take place in the space-time domain or in another domain, e.g., tau-p domain. In another application, it is possible to interleave each shot or every third shot, etc. In still another application, it is possible to interleave each shot from the processed sail line with multiple shots from neighboring sail lines. In yet another application, it is possible to mix in data from source-streamer pairs that have a similar geometry (have the same absolute cross-line distance from the source). For example, it is possible to mix two outer streamers or two inner streamers. Although it is not desirable, it is also possible to mix an inner streamer with an outer streamer of the same sail line.

It is also possible to use the above concepts to attenuate seismic interference/cross-talk noise from sensor arrays placed on or below the sea bottom. In typical ocean bottom cable (OBC) or ocean bottom nodes (OBN) surveys crosstalk noise will appear in a similar way as in towed streamers.

In such surveys, it is possible to mix in data from, for example, the neighboring source line to break up the shot-to-shot coherence of the interference noise.

In step 1410, any one of the 'standard' cross-talk attenuation workflows may be applied to the interleaved seismic data $D_i$ to generate the deblended data $D_d$. For example, a possible cross-talk attenuation workflow may involve a sub-step of transforming the interleaved data $D_i$ from the time-space domain to the tau-p domain, resorting the tau-p data to a common slope p, applying a denoise (random noise attenuation tool) on this common p data (where the crosstalk is 'randomized' due to the line mixing), resorting to normal tau-p, and inverse transforming the data back to the normal t-x space. Alternatively, the noise model made in the tau-p space may be adaptively subtracted from the original data in t-x space.

In step 1412, the deblended seismic data $D_d$ is used to generate an image of the surveyed subsurface.

Instead of using the deblending method as discussed in step 1410, it is possible to use the approach described in Zhang and Wang (2015), where the idea is to use a progressive sparse 2D Tau-P inversion (Wang and Nimsaila (2014)), applied in local spatial windows. This approach produces fewer artefacts, and offers better signal protection in the presence of cross-talk noise compared to the more conventional tau-p transform. The basic algorithm attempts to fit a sparse f–px–py model, M, to the input data, D, when inverse Tau-P transformed:

$$D(f; x^i, y^i) = \sum_j e^{-i2\pi f(x^i p_x^j + y^i p_y^j)} M(f; p_x^j, p_y^j), \qquad (2)$$

where f is the frequency, $(x^i, y^i)$ is the receiver location and $(p_x^j, p_y^j)$ is the slowness pair (i: trace index; j: slowness index). Tau-P coefficients (p-values) that are considered as cross-talk noise based on the median value from a number of neighboring source-cable shots, are scaled down and transferred back to the offset-time domain. In this way, the cross-talk noise is attenuated while the signal is preserved as described by Zhang and Wang (2015).

According to an embodiment, the method discussed with regard to FIG. 14, for removing cross-talk noise from seismic data and generating an image of a surveyed subsurface, may be summarized as follows. The method includes receiving a first seismic dataset D1 containing seismic reflection data from a main source and cross-talk data from an additional source and recorded with seismic sensors over the subsurface; receiving a second seismic dataset D2 including seismic reflection data generated by the main source and the additional source and recorded with the seismic sensors over the subsurface; interleaving first gathers from the first seismic dataset D1 with second gathers from the second seismic dataset D2 to generate an interleaved seismic dataset $D_i$ to attenuate coherent cross-talk noise; applying a standard denoise workflow on the interleaved seismic dataset Di to attenuate residual cross-talk noise and to generate a deblended seismic dataset $D_d$ that includes seismic reflection data from the main source; and generating an image of the subsurface based on the deblended seismic dataset $D_d$.

In one application, the first seismic dataset D1 is recorded along a first sail line and the second seismic dataset D2 is recorded along a second sail line. In another application, the first and second datasets are transformed from the space-time domain to another domain prior to denoising. In still another application, the first gathers from the first seismic dataset and the second gathers from the second seismic dataset share the same source-streamer geometry. The cross-talk noise in the first and second gathers is generated by seismic sources other than the at least two seismic vessels. In one application, the first gathers from the first seismic dataset are collected with ocean bottom nodes. In another application, the method of Claim 1, wherein the first gathers from the first seismic dataset are collected with ocean bottom cables. The step of interleaving may include mixing each gather from the first seismic dataset with a corresponding gather from the second seismic dataset. Alternatively, the step of interleaving may include mixing each gather from the first seismic dataset with plural gathers from the second seismic dataset. In one application, the second dataset belongs to a previously acquired seismic survey. In still another application, the first and second datasets are different vintages of a 4D seismic survey data. The second seismic dataset is a migrated and de-migrated version of the first seismic dataset.

Figure 15:
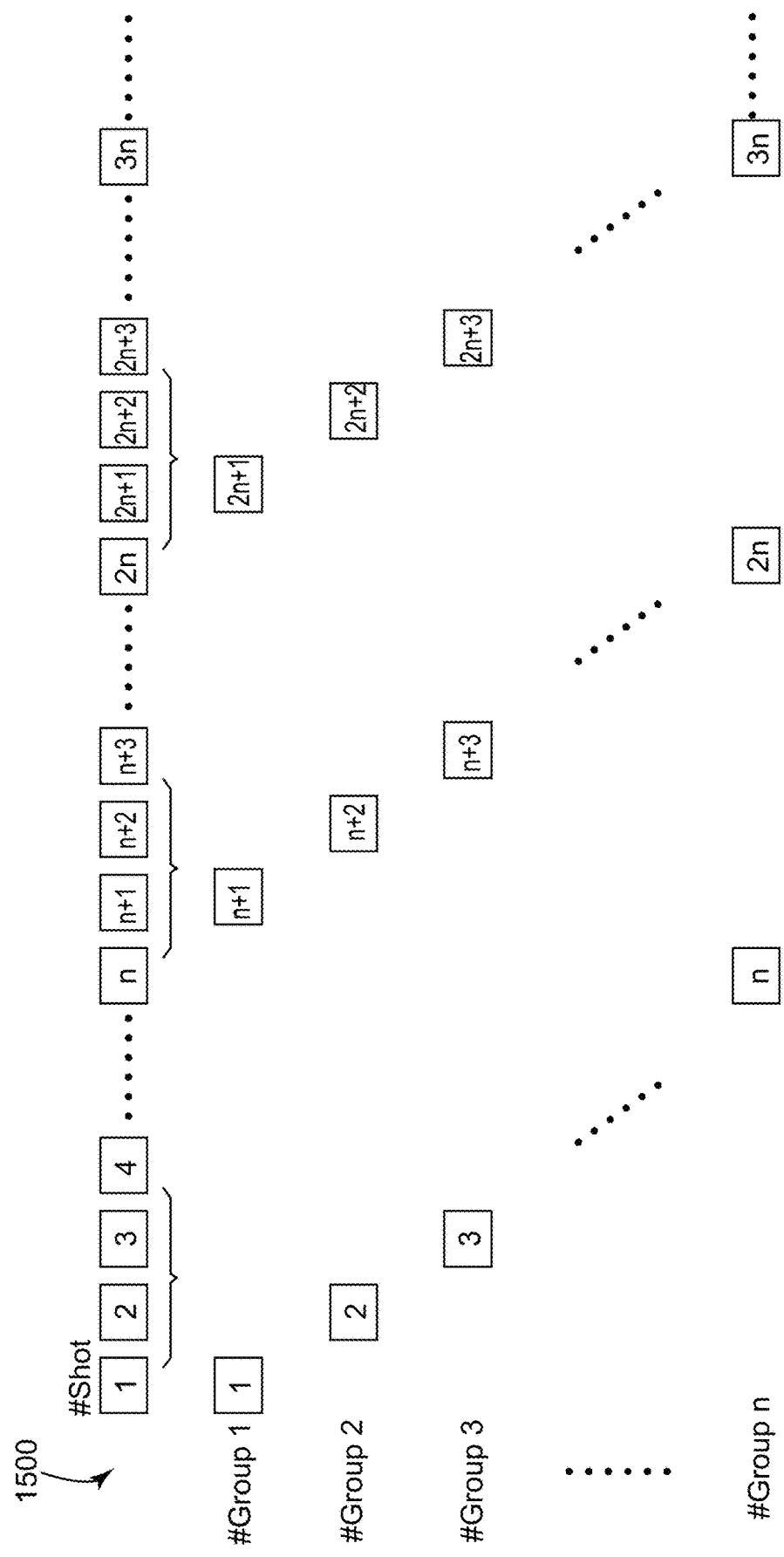
FIG. 15 illustrates a method for dividing seismic shots into groups.

According to another embodiment, it is possible to increase the randomness of the cross-talk noise for acquired seismic data by using a novel method of shot-skip/re-splice of the seismic data. This method is illustrated in FIGS. 15 and 16. FIG. 15 shows a series 1500 of shots 1 to 3n acquired along a sail line during a seismic survey. The seismic acquisition system may include one or more vessels that tow one or more streamers and one or more seismic sources. The series 1500 of shots is then split into groups Group 1 to Group n, each group including n+1 terms. Each group "i" is generated by selecting the "i" term in the series, skipping the next n terms, and then selecting the "i+n" term and so on until all the series is processed. This selection is illustrated in FIG. 15.

Next, the groups are interleaved as now discussed with regard to FIG. 16. If "n" is even, between each consecutive groups in the first half of the series, a group from the second half of the series is added and the group from the second half is selected based on the mathematical relation n/2+1. For example, if n=4, there are four groups, 1 to 4. Group 3 from the second half of the series is mixed in between groups 1 and 2 from the first half of the series, and so on. If n is odd, then the mathematical relationship is adjusted as also shown in FIG. 16, i.e., (n+1)/2+1. In addition, the members (shots) of the groups from the second half of the series are reversed when interleaved between the groups of the first half of the series, as also shown in FIG. 16 for both even and odd n.

After this operation of shooting, skipping and re-splicing, the newly created seismic data set $D_{ssr}$, is ready to be processed with the existing deblending algorithms for reducing the cross-talk noise. In other words, the shot-skip/re-splice data set $D_{ssr}$ can be used in step 1410 in FIG. 14 for denoising and generating the image of the subsurface. This new method of interleaving the data may be used as an auxiliary for the method of FIG. 14, especially when the neighboring sail lines have a different heading direction from the processed sail line or if the adjacent lines have similar cross-talk noise.

Figure 17:
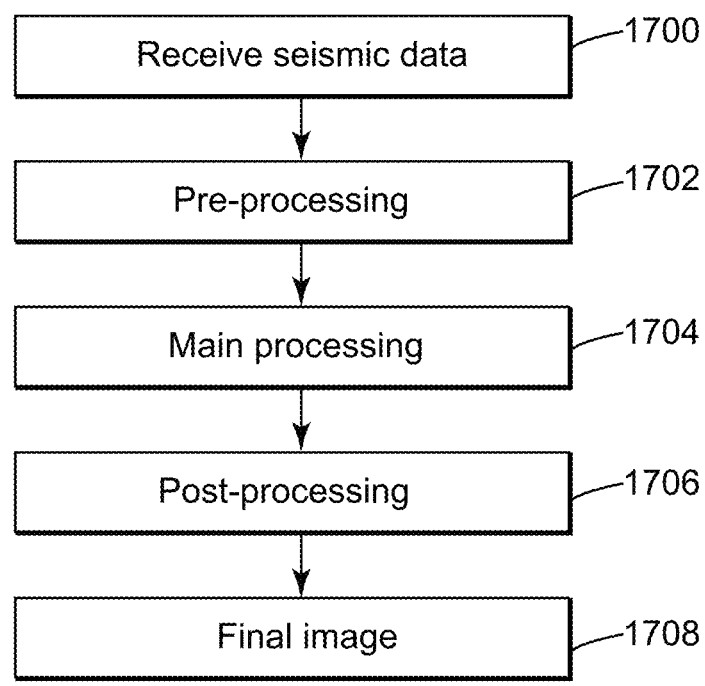
FIG. 17 is a flowchart of a method for processing seismic data.

Various pre-processing and processing algorithms are routinely applied to the acquired seismic data. Such processes are briefly discussed herein. Seismic data D may be received in step 1700 of FIG. 17 at the processing device. In step 1702, pre-processing methods are applied, e.g., demultiple, signature deconvolution, trace summing, vibroseis correlation, resampling, etc. In step 1704, the main processing takes place, e.g., deconvolution, amplitude analysis, statics determination, common middle point gathering, velocity analysis, normal move-out correction, muting, trace equalization, stacking, noise rejection, amplitude equalization, etc. In step 1706, final or post-processing methods are applied, e.g. migration, wavelet processing, inversion, etc. In step 1708 the image of the subsurface may be generated.

According to an embodiment, hydrophone and/or particle velocity data collected from receivers (located, for example, on streamers) are processed according to one or more of the embodiments discussed above. Note that in the field of oil and gas, there are well-established processes for taking seismic raw data and applying various known processing steps, e.g., migration, FWI, denoising, deghosting, etc., for generating an image of the surveyed subsurface. Based on this image, which can be represented in print, on a screen, in a tabular way, etc., an oil and gas reservoir interpreter determines whether oil and/or gas is present in the surveyed subsurface and advises an oil and gas company where to drill a well. The embodiments discussed above improve this technological process of detecting oil and/or gas reservoirs by reducing the coherence noise, which results in a more accurate subsurface image and hence reduced cost associated with the drilling process.

Figure 18:
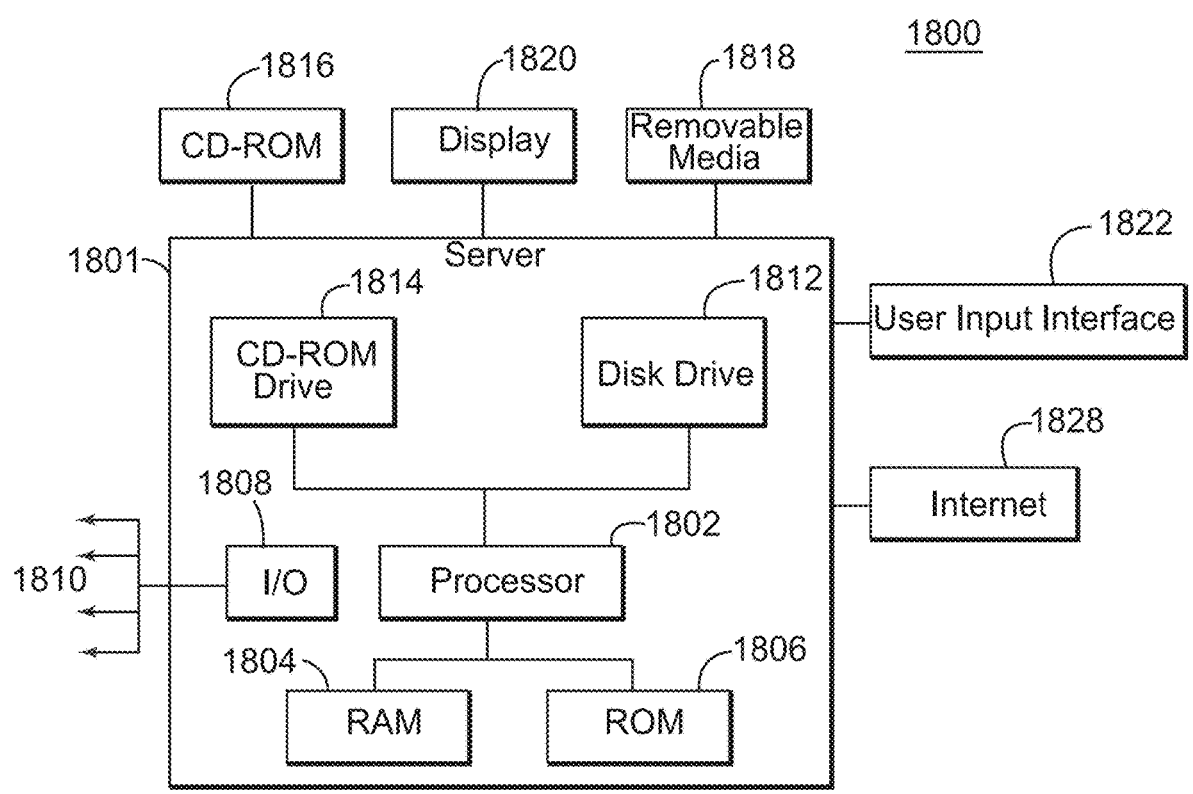
FIG. 18 is a schematic diagram of a computing device that can implement any of the methods discussed herein.

The above-discussed procedures and methods may be implemented in a computing device as illustrated in FIG. 18. Hardware, firmware, software or a combination thereof may be used to perform the various steps and operations described herein. Computing device 1800 of FIG. 18 is an exemplary computing structure that may be used in connection with such a system.

Exemplary computing device 1800 suitable for performing the activities described in the exemplary embodiments may include a server 1801. Such a server 1801 may include a central processor (CPU) 1802 coupled to a random access memory (RAM) 1804 and to a read-only memory (ROM) 1806. ROM 1806 may also be other types of storage media to store programs, such as programmable ROM (PROM), erasable PROM (EPROM), etc. Processor 1802 may communicate with other internal and external components through input/output (I/O) circuitry 1808 and bussing 1810 to provide control signals and the like. Processor 1802 carries out a variety of functions as are known in the art, as dictated by software and/or firmware instructions.

Server 1801 may also include one or more data storage devices, including hard drives 1812, CD-ROM drives 1814 and other hardware capable of reading and/or storing information, such as DVD, etc. In one embodiment, software for carrying out the above-discussed steps may be stored and distributed on a CD-ROM or DVD 1816, a USB storage device 1818 or other form of media capable of portably storing information. These storage media may be inserted into, and read by, devices such as CD-ROM drive 1814, disk drive 1812, etc. Server 1801 may be coupled to a display 1820, which may be any type of known display or presentation screen, such as LCD, plasma display, cathode ray tube (CRT), etc. A user input interface 1822 is provided, including one or more user interface mechanisms such as a mouse, keyboard, microphone, touchpad, touch screen, voice-recognition system, etc.

Server 1801 may be coupled to other devices, such as sources, detectors, etc. The server may be part of a larger network configuration as in a global area network (GAN) such as the Internet 1828, which allows ultimate connection to various landline and/or mobile computing devices.

The disclosed exemplary embodiments provide a computing device, software instructions and a method for seismic data denoising. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

Abma, R., Zhang, Q., Arougunmati, A., Beaudoin, G. [2012] An overview of BP's marine independent simultaneous source field trials 82th SEG International Annual Meeting, Expanded Abstracts, 1-5

Hager, E., Kneale, R., Hansen, L., Thompson, T. [2016] Baxter: a high resolution penta-source marine 3D acquisition. 86th SEG International Annual Meeting. Expanded Abstract, 173-177.

Peng, C., Liu, B., Khalil, A., Poole, G. [2013] Deblending of simulated simultaneous sources using an iterative approach: anexperiment with variable-depth streamer data. 83th SEG International Annual Meeting, Expanded Abstracts, 4278-4282.

Poole, G., Stevens, K., Marschini, M., Mensch, T., Siliqi, R. [2014] Blended dual-source acquisition and processing of broadband data. 76th EAGE Conference & Exhibition, Extended Abstracts.

Wang, M., Chen, Z. H., Chen, C., Loh, F. C., Manning, T., Wolfarth, S. [2016] Advanced deblending scheme for independent simultaneous source data. 25th ASEG Geophysical Conference, Extended Abstract, 1-5.

Saf Akbulut, K., Saeland, O-K., Farmer, P., and Curtis, T. [1984] Suppression of seismic interference noise on Gulf of Mexico data. SEG, Expanded Abstracts, 527-529.

Canales, L. [1984] Random noise reduction. SEG, Expanded Abstracts, 525-527.

Elboth, T., Presterud, I. and Hermansen, D. [2010] Time-frequency seismic data de-noising. Geophysical Prospecting, 58, No 3, 441-453.

Elboth, T., Khan, J. and Shen, H. [2017] Advances in seismic interference noise attenuation. 79th EAGE conference and exhibition 2017.

Gulunay, N. [2008] Two different algorithms for seismic interference noise attenuation. The Leading Edge, 27, 176-181.

Kirlin, R. L. and Done, W. J. [1990] Suppression of coherent noise in seismic data. U.S. Pat. No. 4,910,716.

Larner, K., Chambers, R., Yang, M., Lynn, W., and Wai, W. [1983] Coherent noise in marine seismic data. Geophysics, 48, 854-886.

Wang, P., and K. Nimsaila, (2014) Fast progressive sparse Tau-P transform for regularization of spatially aliased seismic data. 84th Annual International Meeting, SEG, Expanded Abstracts, 3589-3593.

Zhang, Z. and Wang, P. (2015) Seismic interference noise attenuation based on sparse inversion. SEG Technical Program Expanded Abstracts 2015: pp. 4662-4666.

What is claimed is:

1. A method for removing cross-talk noise from seismic data and generating an image of a surveyed subsurface, the method comprising:
receiving input seismic data D generated by firing one or more seismic sources so that detected source energy is overlapping, and the input seismic data D is recorded with seismic sensors over the surveyed subsurface;
generating a cross-talk noise model N by removing at least one original gather and replacing the at least one original gather with a reconstructed gather that is generated based on neighboring gathers of the at least one original gather;
subtracting the cross-talk noise model N from the input seismic data D to attenuate coherent cross-talk noise to obtain processed seismic data DP;
deblending the processed seismic data DP with a deblending algorithm to attenuate a residual noise to obtain deblended seismic data $D_d$; and
generating the image of the subsurface based on the deblended seismic data $D_d$.

2. The method of claim 1, wherein the reconstructed gather is generated based on an interpolation of the neighboring gathers.

3. The method of claim 1, wherein the neighboring gathers are original recorded seismic data.

4. The method of claim 1, wherein the neighboring gathers are reconstructed gathers.

5. The method of claim 1, wherein the neighboring gathers are a mixture of original recorded seismic data and reconstructed gathers.

6. The method of claim 1, wherein the generating the cross-talk noise model N comprises:
removing plural original gathers besides the at least one original gather from the input seismic data D; and
generating plural reconstructed gathers to replace the plural original gathers, each of the plural reconstructed gathers being based on respective neighboring gathers of one of the plural original gathers that the each of the plural reconstructed gathers replaces.

7. The method of claim 6, further comprising:
muting cross-talk noise parts of the reconstructed gathers to obtain a part with a highest signal-to-noise ratio for each one of the reconstructed gathers; and
applying time corrections to the part with the highest signal-to-noise ratio to obtain the cross-talk noise model, wherein the time corrections are related to shot firing times.

8. The method of claim 7, wherein the time corrections are applied prior to the subtracting, on either the input seismic data or the cross-talk noise model or both.

9. The method of claim 8, wherein the time corrections are related to either a primary shot or a blended shot.

10. The method of claim 1, wherein the reconstructed gather is obtained using a simple interpolation, a sparse interpolation or an inversion method in a shot, a channel, or a common mid-point or by replacing a shot with an adjacent shot data.

11. The method of claim 1, wherein the cross-talk noise model is subtracted from the input seismic data D in a shot domain, a channel domain or a common mid-point domain.

12. A computing device for removing cross-talk noise from seismic data and generating an image of a surveyed subsurface, the computing device comprising:
an interface configured to receive input seismic data D generated by firing one or more seismic sources so that detected source energy is overlapping, and the input seismic data D is recorded with seismic sensors over the surveyed subsurface; and
a processor connected to the interface and configured to:
generate a cross-talk noise model N by removing at least one original gather and replace the at least one original gather with a reconstructed gather that is generated based on neighboring gathers of the at least one original gather;
subtract the cross-talk noise model N from the input seismic data D to attenuate coherent cross-talk noise to obtain processed seismic data $D_P$;
deblend the processed seismic data DP with a deblending algorithm to attenuate a residual noise to obtain deblended seismic data $D_d$; and
generate the image of the subsurface based on the deblended seismic data $D_d$.

13. The computing device of claim 12, wherein the reconstructed gather is generated based on an interpolation of the neighboring gathers.

14. The computing device of claim 12, wherein the neighboring gathers are original recorded seismic data.

15. The computing device of claim 12, wherein the neighboring gathers are reconstructed gathers.

16. The computing device of claim 12, wherein the neighboring gathers are a mixture of original recorded seismic data and reconstructed gathers.

17. The computing device of claim 12, wherein the processor is further configured to:
remove plural original gathers besides the at least one original gather from the input seismic data D; and
generate plural reconstructed gathers to replace the plural original gathers, each of the plural reconstructed gathers being based on respective neighboring gathers of one of the plural original gathers that the each of the plural reconstructed gathers replaces.

18. A non-transitory computer-readable medium storing instructions, which when executed by a processor, implement a method for removing cross-talk noise from seismic data and generating an image of a surveyed subsurface, the instructions causing:
receiving input seismic data D generated by firing one or more seismic sources so that detected source energy is overlapping, and the input seismic data D is recorded with seismic sensors over the surveyed subsurface;
generating a cross-talk noise model N by removing at least one original gather and replacing the at least one original gather with a reconstructed gather that is generated based on neighboring gathers of the at least one original gather;
subtracting the cross-talk noise model N from the input seismic data D to attenuate coherent cross-talk noise to obtain processed seismic data $D_P$;
deblending the processed seismic data $D_P$ with a deblending algorithm to attenuate a residual noise to obtain deblended seismic data $D_d$; and
generating the image of the subsurface based on the deblended seismic data $D_d$.

* * * * *